United States Patent [19]
Harget et al.

[11] Patent Number: 6,016,849
[45] Date of Patent: Jan. 25, 2000

[54] PLASTICS PIPE

[75] Inventors: David Charles Harget, Nottingham, United Kingdom; Mikael Andersson, Gothenburg; Eino Matias Holso, Viskafors, both of Sweden; Jyri Jaakko Jarvenkyla, Hollola, Finland

[73] Assignee: Uponor Limited, United Kingdom

[21] Appl. No.: 08/875,130

[22] PCT Filed: Jan. 17, 1996

[86] PCT No.: PCT/EP96/00211

§ 371 Date: Oct. 22, 1997

§ 102(e) Date: Oct. 22, 1997

[87] PCT Pub. No.: WO96/22485

PCT Pub. Date: Jul. 25, 1996

[30] Foreign Application Priority Data

Jan. 18, 1995 [GB] United Kingdom .................. 9500885

[51] Int. Cl.$^7$ ............................. F16L 11/04; F16L 11/00; B29C 47/24
[52] U.S. Cl. .......................... 138/141; 138/137; 264/108; 428/36.91
[58] Field of Search ............................. 138/137, 99, 141; 219/535; 428/36.91; 568/333; 525/350, 67; 285/21; 264/108; 524/113; 521/154; 156/244.11; 254/266

[56] References Cited

U.S. PATENT DOCUMENTS

| | | | |
|---|---|---|---|
| 3,561,493 | 2/1971 | Maillard | 138/141 |
| 4,153,747 | 5/1979 | Young et al. | 138/99 |
| 4,522,852 | 6/1985 | Dunn | 138/137 |
| 4,523,970 | 6/1985 | Tot | 156/244.11 |
| 4,883,622 | 11/1989 | Dealy et al. | 264/108 |
| 4,946,905 | 8/1990 | Weinstein | 525/350 |
| 5,116,082 | 5/1992 | Handa et al. | 285/21 |
| 5,321,233 | 6/1994 | Barrett et al. | 219/535 |
| 5,330,810 | 7/1994 | Nishino | 138/137 |
| 5,449,712 | 9/1995 | Gierke et al. | 524/266 |
| 5,552,448 | 9/1996 | Kobayashi et al. | 521/154 |
| 5,766,712 | 6/1998 | Darr et al. | 428/36.91 |

FOREIGN PATENT DOCUMENTS

| | | | |
|---|---|---|---|
| 0 520 473 | 12/1992 | European Pat. Off. | B32B 1/08 |
| 0 604 907 | 7/1994 | European Pat. Off. | B29C 47/06 |
| 2 577 466 | 8/1986 | France | B29C 47/02 |
| 94 11 008 | 10/1994 | Germany | F16L 9/12 |

*Primary Examiner*—Lesley D. Morris
*Assistant Examiner*—Davis Hwu
*Attorney, Agent, or Firm*—Fish & Richardson P.C.

[57] ABSTRACT

A plastic pipe which includes an inner core and an outer protective layer bonded thereto, in which the dimensions of the pipe and the protective layer are such that the ratio of the external diameter of the pipe to the thickness of the protective layer is at least 70, preferably at least 100, and the cohesive strength of the outer protective layer, excluding any lines of weakness, at least at the ends of the pipe is greater than the peel strength of the adhesive bond between the outer protective layer and the inner core.

22 Claims, No Drawings

PLASTICS PIPE

This application is a 35 USC 371 application of International Patent Application No. PCT/EP96/00211, with an international filing date of Jan. 17, 1996, now pending.

This invention relates to plastics pipes and more particularly to a novel construction of plastics pipe, a method for its manufacture, and a method for making joints in such a pipe.

In the handling, installation and connection of plastics pipes, the pipe surface is easily damaged. In modern plastic pipe installation techniques, for example, a tunnel is bored in the ground for the pipe, and the pipe is then pushed or pulled through the tunnel, for example, into an excavated hole where the next pipe joint is to be made.

The pipe-laying method can subject the pipe to substantial bending, tensile and abrasive contact forces. This is disadvantageous since bending, stretching and abrasion of a pipe can result in a deterioration of its mechanical strength. In addition, the useful life of the pipe may be reduced by diffusible materials in the ground, or by environmental conditions.

It will be apparent that the method of pipe-laying can also result in the pipe becoming scratched and dirty. This is disadvantageous firstly as the pipe material may be notch sensitive, in which case any scratches may cause greater damage to occur in the pipe during subsequent handling or use. Secondly, dirt on the pipe prevents successful welding. At the present time, a common technique for jointing plastic pipes is electric welding, and particularly electrofusion welding, using an electrofusion coupler. The main reason for failure of joints using an electrofusion coupler is that the surface of the pipe is dirty or has become oxidised. For this reason the pipe ends always have to be cleaned and abraded or scraped, for example with sandpaper or a metal scraper, before jointing. In practice, the cleaning and abrading or scraping is often uneven (the underside of the pipe in particular may be treated less carefully) and the quality of the end result depends upon the professional skill of the installer.

A variety of suggestions have been put forward to overcome the above-mentioned disadvantages.

In European Patent Application No. 0474583 there is described a plastic pipe to be laid in the ground which comprises a gas or water conducting core pipe provided with an outer hose of a thermoplastic material having a higher flexibility than the material of the core pipe. The pipe is stated to be able to resist the extensive mechanical stresses to which it is subjected during direct laying into the ground. It is stated to be easy to remove the outer hose adjacent the ends of the pipe when two pipe sections are to be assembled by welding. It is also stated that formation of cracks caused by damage to the protective hose does not spread to the core pipe, but stops when the hose has been penetrated.

In PCT/FI92/00201 there is described a plastics pipe for making pipe joints characterised in that the pipe is covered by a plastic surface layer as a protective coating which is easily detachable at least at the ends of the pipe, in order to uncover the joint surface of the pipe necessary for making the pipe joint. The protective coating can contain UV stabilisers and may be applied by co-extrusion through a cross-head extrusion nozzle. Various ways of making the protective coating easily detachable from the core pipe are disclosed, including the use of fillers in the coating, the choice of chemically different plastics materials for the coating and the pipe, extruding the coating at low temperatures, and the introduction of adhesion preventing agents.

In PCT/FI93/00038 there is described a two-layer plastics pipe which comprises a core pipe whose material, size and structure essentially meet the requirements set by the material to be conveyed and an outer hose provided around the core pipe by a suitable coating method, the properties of the outer hose essentially meeting the requirements set by the environment and for the laying procedure. The stiffness of the outer hose, based on its material properties or the design of the outer hose, is higher than the stiffness of the core pipe manufactured from the same amount of material, and the outer hose is removable at least at the ends of the pipe. The outer hose is again applied by co-extrusion using a cross-head extrusion die. The protective outer hose is made so as to be easily detachable at least at the pipe ends and to have low adhesion thereto.

Japanese Patent Publication No. 3-24392 describes an electrofusion pipe characterised in that it consists of a pipe body consisting of a thermoplastic resin and a protective layer consisting of an incompatible resin covering the outside surface of the pipe body. The pipe body can consist of a tubular crosslinked thermoplastic resin layer and a non-crosslinked thermoplastic resin layer integrally formed on the outside of this thermoplastic resin layer and a protective layer consisting of an incompatible resin covering the outside surface of the pipe body. The protective layer can be peeled off and an electrofusion joint made.

The entire disclosures of all the above-mentioned patent specifications are incorporated herein by reference for all purposes.

The present invention provides a plastics pipe comprising an inner core and an outer protective layer having an improved combination of mechanical and physical properties.

It has now been found, in accordance with one aspect of the invention, th at the relative dimensions of the plastics pipe and the thickness of the outer protective layer have a profound affect upon the performance of the pipe. It has also been found that, firstly in order to achieve an advantageous combination of mechanical strength to resist the severe conditions involved in laying the pipe and also to provide a sufficient degree of environmental protection, together with an appropriate degree of peelability, requires a particular choice of mechanical properties and dimensions.

In accordance with a first aspect of the present invention, therefore, there is provided a plastics pipe which comprises an inner core and an outer protective layer, in which:
the dimensions of the pipe and the protective layer are such that the ratio of the external diameter of the pipe to the thickness of the protective layer is at least 70, preferably at least 100, and
the cohesive strength of the outer protective layer, excluding any lines of weakness, at least at the ends of the pipe, is greater than the strength of the adhesive bond between the outer protective layer and the inner core.

In accordance with a second aspect of the invention, it has also been found that the extent of the adhesion between the inner core and the outer protective layer also has a substantial influence upon the performance of the pipe. If the adhesion is too great or too small, the mechanical properties of the pipe, and in particular the impact strength, may be adversely affected.

The adhesive bond preferably has relatively low peel and relatively high shear characteristics. Preferably the adhesion between the outer protective layer and the inner core is in the range of from 0.2 to 0.5 N/mm width, measured by a semi-tensile peel test as hereinafter described.

Whilst it may be possible to obtain an adhesion between the protective layer and the inner core within the preferred range using a cross-head extrusion method wherein the protective layer is extruded over the solidified inner core, we have found that consistently improved results are obtained by dual extrusion in which both components are extruded and brought together before substantial oxidation of the outer surface of the inner core has taken place.

Accordingly, in another aspect the invention provides a method for the production of a plastics pipe comprising an inner core and an outer protective layer which comprises co-extruding molten plastics materials forming the inner core and the outer protective layer from an extruder die, bringing the extrudates together whilst still hot and allowing them to cool, such that, on cooling, the outer protective layer can be peeled from the inner core, at least at the ends of the pipe, to reveal an inner core surface suitable for electrofusion welding.

In a further aspect, the invention provides a plastics pipe which comprises an inner core and an outer protective layer, in which:

the adhesion between the outer protective layer and the inner core is such that, in a B50 Impact Test in accordance with CEN TC155W1 081(291) document reference 155N696E, at 0.° C., if the outer core is ruptured and a crack formed, that crack is arrested at the outer layer/inner core interface.

In a still further aspect, the invention provides a plastics pipe which comprises an inner core and an outer protective layer, in which:

the plastics pipe has an impact resistance greater than 150 Nm in a B50 Impact Test in accordance with CEN TC155W1 081(291) document reference 155N696E, at 0.° C., and wherein the cohesive strength of the outer protective layer, excluding any lines of weakness, at least at the ends of the pipe, is greater than the strength of the adhesive bond between the outer protective layer and the inner core.

In a still further aspect, the invention also provides a method of making a joint in a plastics pipe according to the invention, or of joining two ends of plastics pipes according to the invention, which comprises peeling the outer protective layer from the region or regions of the pipe or pipes to be joined, installing an electrofusion coupler over the bared regions of the pipe or pipes and activating the electrofusion coupler to fuse the region or regions of the pipe or pipes thereto.

The plastics pipe can comprise any suitable thermoplastic polymeric material, and particularly suitable polymeric materials include, for example, olefinically-unsaturated polymers and co-polymers, for example, polyolefins such as polyethylene, polypropylene and polybutene, ethylene and propylene co-polymers, for example, ethylene-vinyl acetate polymers, and propylene-vinyl acetate polymers, halogenated-vinyl polymers such as vinyl chloride polymers and co-polymers, polyamides, for example, nylon 6 and nylon 66, and ionomer polymers such as Surlyn.

The inner core of the pipe is chosen to be compatible with the particular application, and in particular with the fluid material to be conveyed by the pipe. For many applications polyethylene is the preferred material for the inner core. The grade of polyethylene chosen, that is to say, high density, medium density, low density or linear low density, will depend upon the particular application. Suitable grades of polyethylene include, for example, Statoil 930 (natural), Neste NCPE 2600 (natural) and Neste NCPE 2467 BL and NCPE 2418. Any suitable equivalent grade of polyethylene may of course also be used.

An advantage of the plastics pipes of the present invention is that the normal UV stabiliser and colorant package need not be included in the plastics material of the inner core, provided that sufficient quantities of these materials are included in the outer protective layer. This enables the inner core to comprise natural polymeric material, free or substantially free from additives which add to the cost of the core material and which, in certain circumstances, may impair the mechanical or physical properties of the core material.

The outer protective layer is preferably formed from a polymeric material or blend of polymeric materials having good mechanical and physical properties, together with an ability to receive quantities of stabilising materials, in particular UV stabilisers, sufficient to protect the inner core. Preferred polymeric materials for the outer protective layer comprise propylene homo- and co-polymers, and especially propylene co-polymers such as, for example, Neste SA 4020G. Other polymeric materials with suitable mechanical and physical properties, for example nylons and Surlyn, can also be used in appropriate circumstances.

Suitable stabiliser materials include, for example, titanium dioxide, carbon black, and other fillers. Whilst carbon black is an excellent UV stabiliser and reinforcing filler, buried pipes are frequently colour-coded and its use is therefore not possible for many applications. Titanium dioxide is, therefore, the preferred filler and UV stabiliser, since this is also compatible with many colorant packages, Other filler materials such as chalk and talc, and those mentioned in PCT/F193/00038 may also be used. The preferred filler particle size will depend on the filler being used, but for titanium dioxide, for example, the average particle size range is preferably from 0.003 to 0.025 $\mu$m.

A particularly preferred plastics pipe according to the present invention comprises an inner core of polyethylene and an outer protective layer of a propylene co-polymer. The pipe can of course comprise more than two layers of polymeric material, and all suitable multilayer pipes are included provided that at least one inner core and one protective outer layer are present. The pipe can, for example, comprise a multilayer inner core and a protective outer layer.

Whilst the thickness of the outer protective layer needs to be sufficient to accept the appropriate quantities of UV stabilisers and colourants necessary to protect the inner core and also to provide appropriate identification, if it is too thick, rendering the outer layer too stiff, we have found that the impact strength of the pipe is unexpectedly reduced.

Without wishing to be bound by any particular theory, it is believed that the impact strength of the plastic pipes of the invention is related in part to the adhesion between the inner core and the outer protective layer. If the adhesion is too small the outer protective layer behaves as a relatively thin structurally independent tube and is therefore susceptible to impact damage. If the adhesion is too great, cracks formed by rupture of the outer layer have a tendency to propagate through to the inner core. Ideally, therefore, the adhesion between the outer protective layer and the inner core should be sufficient that, even if the outer core is ruptured and a crack formed, the crack is arrested at the outer layer/inner core interface.

Preferably the outer protective layer has a thickness greater than 0.1 mm, more preferably greater than 0.2 mm, and most preferably has a thickness in the range of from 0.3–0.5 mm.

The dimensions of the pipe and the protective layer are such that the ratio of the external diameter of the pipe to the thickness of the protective layer is at least 70, preferably at least 100. From this it can be seen that it is possible to use a thicker protective layer on a pipe of greater diameter, although for easy peelability the thickness is preferably kept to a minimum.

Examples of suitable pipe external diameters and outer protective layer thicknesses are as follows:

| Pipe OD (mm) | Outer layer thickness (mm) | SDR |
|---|---|---|
| 25–30 | 0.3 | 83–100 |
| 30–50 | 0.3 | 100–166 |
| 63–125 | 0.4 | 157–312 |
| >125 | 0.5 | 250–500 (at 250 mm Pipe OD) |

Preferably the dimensions of the pipe and the protective layer are such that the ratio of the external diameter of the pipe to the thickness of the protective layer (standard dimension ratio SDR) is in the range of 150 to 400.

It is important, when stripping off the outer protective layer from the ends of the pipe, that the cohesive strength of the outer protective layer is greater than the strength of the adhesive bond between the outer protective layer and the inner core. The reason for this is to prevent any substantial sized particles of the outer protective layer from adhering to the outer surface of the inner core and interfering with the jointing process, when using, for example, an electrofusion coupler. Preferably the arrangement is such that when stripped off, the outer protective layer leaves no residue on the outer surface of the inner core. In general, the cohesive strength of the outer protective layer is preferably at least 5 MPa, and most preferably in the range of from 5 MPa to 10 MPa.

Notwithstanding the above, the outer protective layer may be provided with lines of weakness to assist peeling back, which lines may be produced by scoring, or preferably by suitably shaping the extrusion die, or by cooling the die locally, for example, as described in PCT/F192/00201.

In order further to assist the stripping off the outer protective layer, the extrusion conditions may be arranged such that the strength properties of the outer protective layer are different in the radial and axial directions.

As previously mentioned, the adhesion between the outer protective layer and the inner core is preferably in the range of from 0.2 to 0.5 N/mm width as measured by a semi-tensile peel test. A suitable test is described below:

A test specimen of pipe is prepared by cutting two parallel axial notches through the whole of the surface layer for 50 mm, and extending these notches for a further 50 mm with a depth such that 0.3 mm is left of the surface layer. A further 20 mm length of specimen is allowed before the vertical alignment with the load cell.

The tear test is performed in an Instron model 1197 with a speed of 100 mm per minute. The pipe is placed so that the start of the tearing at the beginning of the through notch depth is 120 mm from the centre of the load cell and the distance from the start of the tearing to the fastening point of the load cell is 750 mm. The apparatus is shown diagrammatically in FIG. 1. The result is that the largest tear angle is achieved whilst tearing that part of the pipe with a notch through the surface layer.

Although not presently preferred, it may be possible to provide an adhesive layer between the inner core and the outer protective layer which would have the appropriate adhesion characteristics. If an adhesive is used it should preferably have a high cohesive strength so that it does not leave a residue when stripped from the pipe, or alternatively, if any residue is left on the pipe it should be such as to aid, rather than hamper, fusion.

The impact strength of the plastics pipe of the invention is preferably comparable with the impact resistance of a plastics pipe of the same dimensions formed entirely from the plastics material of the inner core. Preferably the impact strength is at least 150 Nm when measured at 0° C. in a B50 Impact Test in accordance with CEN TC155W1 081(291) document reference 155N696E, the entire disclosure of which is incorporated herein by reference. Excellent impact strength is obtained using a plastics pipe comprising an inner core of polyethylene and an outer protective layer of a propylene copolymer.

As previously mentioned, the plastics pipe of the present invention is preferably produced by co-extrusion, for example, from an extruder die connected to a twin barrel, twin screw extruder, or connected to two individual extruders, the die being fed with separate streams of molten plastics material. Preferably the melt streams are brought together in the die, that is to say, the materials are brought together in the pressure area of the die and exit as a single extrudate. Alternatively, the die may be provided with concentric die outlets fed with the separate streams of molten plastics material which are to form the inner core and the outer protective layer. In this case, the extrudates, on leaving the extruder die outlets, can be brought into contact with each other in a sizing die which simultaneously adjusts the outer diameter of the pipe. The extrudates are preferably brought into contact with each other at a point close to the extruder die outlet, in order to avoid any substantial oxidation of the surface of the inner core. For example, with extrudates travelling at a speed of 1 meter per minute, the sizing die is preferably not further than 15 cm from the extruder die outlet.

Whilst it may in certain circumstances be possible to pass the inner core extrudate through an individual sizing die before applying the outer protective layer this is not preferred because it has been found that the sizing die creates an outer surface layer on the inner core which is more susceptible to degradation, possibly due to induced shear orientation or shear nucleation in the outer surface which contacts the sizing die.

The temperature of the extrudates will depend upon the nature of the polymeric material, but, for example, using a polyethylene inner core and a propylene co-polymer outer protective layer the temperature of the extrudate at the die outlet is preferably from 180 to 220° C. Preferably the temperature of the extrudates when they are brought together is at least 150° C., most preferably from 180 to 220° C.

The method of the invention can consistently produce an inner core and an outer protective layer having an adhesion within the preferred range, and by an appropriate choice of the material of the outer protective layer it can be arranged that the outer protective layer can be peeled from the inner core without leaving any significant residue on the surface of the inner core. If necessary, the physical properties of the outer protective layer can be adjusted by the addition of more or less fillers and other additives. A preferred polymeric material for the outer protective layer comprises, for example, propylene co-polymer comprising from 1 to 6% by weight, based upon the total weight of the composition, of a filler such as titanium dioxide. Preferably the outer protective layer has a tensile strength of from 15 to 25 MPa.

In general we have found that it is preferable not to use low molecular weight additives such as, for example, processing aids, in the method of the invention. However stearates, for example, calcium stearate, have been found to be effective as processing aids without substantially adversely affecting the adhesion between the inner core and the protective layer.

Antioxidants can be included in the formulation of the protective layer as required. If appropriate, they can be omitted from the formulation of the inner core provided that suitable quantities are included in the outer protective layer.

The invention is illustrated by the following Example:

EXAMPLE

A number of formulations for the inner core and the outer protective layer were made up with compositions as set out in Table 1. The formulations were extruded using a main extruder and a smaller additional extruder provided with concentric die feed. The melt streams were merged prior to exit from the hot dies. In one experiment, the extrudate, having a diameter of 80 mm, was passed through a sizing die of diameter 66.8 mm to give a dual layer pipe of external diameter 63.8 mm, outer protective layer thickness 0.3 mm and inner core thickness 6.2 mm. In another experiment, a dual layer pipe of 40 mm external diameter was extruded.

Samples of the 40 mm OD pipes were subjected to the semi-tensile peel test previously described, and the results are given in Table 2. Table 3 shows similar results on samples which could not be peeled at room temperature and therefore were heat treated in an oven before being subjected to the peel test. These examples are included for comparison purposes.

Samples of the tubes were also subjected to ageing according to the weather durability test of ISO 4892. The test method is given below. The properties of the pipes were found to be substantially unaffected after being subjected to the ageing test showing that the natural inner core was effectively protected by the stabiliser package included in the outer protective layer. The results are given in Table 4.

Further samples of the pipes were subjected to B50 impact testing in accordance with CEN TC155W1 081(291) document ref. 155N696E. The impact tests were performed at 0° C. and −20° C. A pipe was considered to have passed if it had a measured impact strength of greater than 150 Nm.

It was found that pipes with a polypropylene co-polymer outer layer passed all the impact tests and had approximately the same behaviour as uncoated polyethylene pipes of the same diameter.

Pipes with a polypropylene homopolymer outer layer had reduced impact strength of 33 Nm at 0° C. compared with more than 150 Nm for an equivalent uncoated polyethylene pipe and were considered to have failed.

A 50/50 polypropylene homopolymer and co-polymer mixture was also tested. This pipe passed the impact test at 0° C. with an impact strength greater than 150 Nm but the results at −20° C. were the same as for the polypropylene homopolymer.

Failure in the impact test was due to a type of rupture in which a crack originated in the outer layer and propagated to the pipe. It is believed that those samples which failed the impact test did so because the adhesion between the outer layer and the inner core was too great.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. This invention extends to any novel one, or any novel combination, of the features disclosed in this specification (including any accompanying claims, abstract and drawings), or to any novel one, or any novel combination, of the steps of any method or process so disclosed.

TABLE 1

|  | 97 | 98 | 99 | 100 | 101 | 102 | 103 | 104 | 105 | 106 | 107 | 108 | 109 | 110 | 111 | 112 |
|---|---|---|---|---|---|---|---|---|---|---|---|---|---|---|---|---|
| Material Pipe | 930 | 930 | 930 | 2600 | 2600 | 2600 | 2600 | 2600 | 2600 | 2600 | 2600 | 2467b1 | 2467b1 | 2467b1 | 2467b1 | 2410 |
| Material Skin | 1 | 2 | 3 | 1 | 1 | 1 | 1 | 1 | 1 | 1 | 1 | 1 | 1 | 1 | 3 | 1 |
| Masterbatch | 4 | 4 | A | 4 | 5 | 5 | 4 | 4 | 4 | 4 | 4 | 4 | 4 | NONE | NONE | NONE |
| Loading % | 10 | 10 | 10 | 10 | 10 | 15 | 15 | 15 | 10 | 0 | 15 |  |  |  |  |  |

Material
Two different types of pigmented master batches were used at two concentrations
1 - Polypropylene SA 4020 G manufactured by Neste
2 - Polypropylene SA 4020 G/VA4020 E 50/50 mixture
3 - Polypropylene VA 4020 E
4 - 84571-2009 from Wilson colour tio based
5 - 84671-2100 from Wilson Colour titanate based
930 Polyethylene Statoil 930 (natural)
2600 Polyethylene Neste 2600 (natural)
2467b1 Polyethylene Neste N2410
Master Batches

|  | 845671-2009 | 84671-2100 |
|---|---|---|
| $TiO_2$ | 30 | 2,5 |
| Irganox 1010 | 1 | 1 |
| Chiasorb 944 | 1 | 1 |
| Titanate | 0 | approx 30 |
| PP(mfi 5.0) | carrier | carrier |

TABLE 2

| Prod. No. | Surface Layer thickn. mm | width mm | 1. Notch through N/mm | 2. Notch with 0.3 mm left N/mm | 3. Force to break N/mm | Remark |
|---|---|---|---|---|---|---|
| E101 | 0.34 | 10.03 | 1.25 | 4.88 | 5.23* | 1. & 3. Came off well, big tension. |
|  | 0.35 | 9.88 | 1.16 | 5.36 | 5.66 | 2. Came off well at notch through the surface layer. |
|  | 0.41 | 9.75 | 1.38 | 7.38 | 5.74* | Was torn at the side of the notch with 0.3 mm left. |
| E102 | 0.31 | 9.80 | 1.30 | 2.75 | 5.39* | 1. Came off well, big tension. |
|  | 0.40 | 9.94 | 1.08 | 2.51 | 7.40* | 2. Came off well, big tension. |
|  | 0.30 | 9.80 | 1.71 | 2.24 | 6.12* | 3. Came off well, big tension. |
| E103 | 0.30 | 9.70 | 2.52 | 3.91 | 7.19* | 1. Came off well, big tension. |
|  | 0.35 | 10.00 | 1.40 | 5.88 | — | 2. Break while tearing notch with 0.3 mm left. |
|  | 0.44 | 9.50 | 2.05 | 4.73 | 8.47* | 3. Came off well, big tension. |
| E104 | 0.57 | 9.75 | 2.36 | 7.18 | 11.84* | 1. Came off well, big tension. |
|  | 0.51 | 9.71 | 0.51 | 4.22 | 12.20* | 2. Came off well, big tension. |
|  | 0.39 | 9.45 | 1.00 | 5.71 | 10.10* | 3. Came off well, big tension. |
| E105 | 0.27 | 9.70 | 1.39 | 5.92 | 6.08* | 1. Came off well at notch through the surface layer. Was torn at the side of the notch with 0.3 m left. |
|  | 0.21 | 10.12 | 1.53 | 5.18 br | 5.18 | 2. Break while tearing notch with 0.3 mm left. |
|  | 0.26 | 9.62 | 2.49 | 5.87 | 6.82 | 3. Came off well. |
| E106 | 1.00 | 9.25 | 1.45 | 8.00 | 20.32 | 1. Came off well. |
|  | 0.60 | 9.80 | 0 | 3.77 | 13.09 | 2. & 3. Came off without any load at notch through the surface layer. |
|  | 0.65 | 9.50 | 0 | 3.63 | 14.08 |  |
| E107 | 0.65 | 10.00 | 0 | 4.10 | 14.0* | 1. & 2. Came off without any load at notch through the surface layer, big tension. |
|  | 0.65 | 9.40 | 0 | 3.98 | 13.51 |  |
|  | 1.00 | 9.30 | 0.75 | 8.17 | 18.80 | 3. Came off well. |

* Maximum force at the tensile test, but there was no break.

TABLE 3

| Prod. No. | Surface Layer thickn. mm | width mm | 1. Notch through N/mm | 2. Notch with 0.3 mm left N/mm | 3. Force to break N/mm | Remark |
|---|---|---|---|---|---|---|
| E 97 50° C. 1 h | 0.25 | 9.75 | 2.20 | 2.87 | 5.12* | 1. Came off well, the tearing kept on to the edge of the test piece. |
|  | 0.35 | 10.00 | 2.40 | 3.40 | 6.58* | 2. Came off well, the tearing kept on to the edge of the test piece. |
|  | 0.25 | 9.40 | 2.39 | 4.36 | 4.65* | 3. Came off well, big tension. |
| E 97 60° C. 1 h | 0.20 | 9.40 | 2.37 | 2.92 | 5.87* | 1. Came off well, the tearing kept on to the edge of the test piece. |
|  | 0.25 | 9.55 | 2.25 | 2.93 | 5.03* | 2. Came off well, big tension. |
|  | 0.30 | 9.65 | 2.11 | 3.00 | 6.79* | 3. Came off well, the tearing kept on to the edge of the test piece. |
| E 97 70° C. 1 h | 0.30 | 9.80 | 1.56 | 3.91 | 6.36* | 1. Came off well, the tearing kept on to the edge of the test piece. |
|  | 0.25 | 9.65 | 2.33 | 5.88 | 6.53* | 2. Came off well, the tearing kept on to the edge of the test piece. |
|  | 0.25 | 9.50 | 2.15 | 4.73 | 4.89* | 3. Came off well, big tension. |
| E 100 50° C. 1 h | 0.40 | 9.55 | 1.62 | 4.50 | 8.64* | 1. Came off well, big tension. |
|  | 0.43 | 9.75 | 1.23 | 2.61 | 7.67* | 2. Came off well, the tearing kept on to the edge of the test piece. |
|  | 0.30 | 9.75 | 1.74 | 2.71 | 5.74* | 3. Came off well, big tension. |
| E 100 60° C. 1 h | 0.30 | 9.60 | 1.82 | 2.97 | 5.52* | 1. Came off well, big tension |
|  | 0.40 | 9.75 | 2.26 | 4.11 | 8.07* | 2. Came off well, big tension. |
|  | 0.25 | 9.55 | 2.72 | 3.56 | 6.70* | 3. Came off well, big tension. |
| E 100 70° C. 1 h | 0.35 | 9.90 | 1.96 | 3.24 | 6.97* | 1. Came off well, big tension. |
|  | 0.30 | 9.60 | 2.76 | 4.37 | 7.50* | 2. Came off well, the tearing kept on to the edge of the test piece. |
|  | 0.30 | 9.50 | 2.00 | 3.16 | 5.63* | 3. Came off well, big tension. |

*Maximum force at the tensile test, but there was no break.

AGEING OF POLYETHYLENE/POLYPROPYLENE PIPES

Weather-durability Testing According to ISO 4892

Test Object 61 pieces of polyethene pipes with a length of 465 mm and a diameter of 40 mm

| | |
|---|---|
| 9 pieces, yellow tubes marked | E100 |
| 9 pieces, yellow tubes marked | E102 |
| 9 pieces, yellow tubes marked | E103 |
| 9 pieces, yellow tubes marked | E104 |
| 8 pieces, yellow tubes marked | E106 |
| 8 pieces, white tubes marked | E107 |
| 9 pieces, black/orange, yellow tubes marked | E108 |

Test Performance

The polyethene tubes were exposed in an Atlas Type 65 Weather-o-meter® according to the rain cycle 102/18.

The temperature on a black standard thermometer was 63±3° C. and the relative humidity 50±5%.

The light source was filtrated to reach a lower limit of 290 nm.

The irradiance was 61±6 W/m$^2$ in the bandpass 280–400 nm.

The exposure was completed after 250 hours, which corresponds to a 3 months of light dose in the UV visible wavelength interval (280–800 nm) for London, England.

TABLE 4

TENSILE STRENGTH SKIN/TESTING INFLUENCE OF UV AGEING

| | | | | | | |
|---|---|---|---|---|---|---|
| UV aged | Av tensile str (mpa) | 29.53 | 26.98 | 27.82 | 30.74 | 28.32 |
| | Variation (%) | 1.20 | 1.30 | 1.60 | 2.60 | 0.80 |
| | Elongation (%) average | 413 | 368 | 507 | 173 | 120 |
| | Elong min | 400 | 5.4?? | 480 | 20 | 0 |
| | Elong max | 420 | 580 | 540 | 100 | 280 |
| Ref | Av tensile str (mpa) | 27.26 | 26.33 | 32.17 | 28.24 | 28.99 |
| | Variation (%) | 3.80 | 0.40 | 5.80 | | 2.30 |
| | Elongation (%) average | 706 | 540 | 153 | 507 | 453 |
| | Elong min | 700 | 540 | 200 | 500 | 140 |
| | Elong max | 720 | 540 | 400 | 520 | 640 |

TENSILE STRENGTH SKIN/TESTING INFLUENCE OF UV AGEING

| | | | | | | |
|---|---|---|---|---|---|---|
| UV aged | AV tensile str (mpa) | 24.40 | 24.49 | 24.61 | 25.24 | 26.10 |
| | Variation (%) | 0.90 | 0.50 | 0.70 | | 7.40 |
| | Elongation (%) average | 673 | 650 | 673 | 673 | 680 |
| | Elong min | 640 | 640 | 660 | 640 | 660 |
| | Elong max | 720 | 680 | 680 | 700 | 720 |
| Ref | AV tensile str (mpa) | 24.35 | 24.45 | 24.79 | 25.17 | 25.37 |
| | Variation (%) | 1.10 | 1.80 | 0.50 | 0.70 | 0.50 |
| | Elongation (%) average | 673 | 690 | 667 | 685 | 645 |
| | Elong min | 640 | 640 | 640 | 660 | 600 |
| | Elong max | 740 | 740 | 720 | 700 | 680 |

We claim:

1. A plastics pipe which comprises an inner core and an outer protective layer bonded thereto, in which the dimensions of the pipe and the protective layer are such that the ratio of the external diameter of the pipe to the thickness of the protective layer is at least 70, and the cohesive strength of the outer protective layer, excluding any lines of weakness, at least at the ends of the pipe is greater than the peel strength of the adhesive bond between the outer protective layer and the inner core.

2. A plastics pipe which comprises an inner core and an outer protective layer bonded thereto, in which the adhesion between the inner core and the outer protective layer is such that, in a B50 impact test in accordance with CEN TC155W1 081(291) document reference 155N696E, at 0° C., if the outer layer is ruptured and a crack formed, that crack is arrested at the outer layer/inner core interface.

3. A plastics pipe which comprises an inner core and an outer protective layer bonded thereto, in which the plastics pipe has an impact resistance greater than 150 Nm in a B50 impact test in accordance with CEN TC155W1 081(291) document reference 155N696E measured at 0° C., and wherein the cohesive strength of the outer protective layer, excluding any lines of weakness, at least at the ends of the pipe, is greater than the peel strength of the adhesive bond between the outer protective layer and the inner core.

4. A plastics pipe according to any of the preceding claims, in which the adhesion between the outer protective layer and the inner core is in the range of from 0.2 to 0.5 N/mm width, measured by a semi-tensile peel test as hereinbefore described.

5. A plastics pipe according to claim 4, in which the inner core comprises polyethylene.

6. A plastics pipe according to claim 4, in which the outer protective layer comprises a propylene homo or co-polymer.

7. A plastics pipe according to claim 4, in which the inner core is substantially free from anti-oxidants and/or UV stabilisers.

8. A plastics pipe according to claim 6, in which the outer protective layer comprises titanium dioxide filler.

9. A plastics pipe according to claim 4, in which the outer protective layer has a thickness in the range of from 0.3 to 0.5 mm.

10. A plastics pipe according to claim 4, in which the ratio of the external diameter of the pipe to the thickness of the protective layer is in the range of 150 to 400.

11. A plastics pipe according to claim 4, in which the cohesive strength of the outer protective layer is in the range of from 15 MPa to 25 MPa.

12. A plastics pipe according to claim 4, in which the outer protective layer has a tensile strength of from 5 MPa to 10 MPa.

13. A method for the production of a plastics pipe comprising an inner core and an outer protective layer bonded thereto which comprises co-extruding molten plastics materials forming the inner core and the outer protective layer from an extruder die, bringing the molten plastics materials together whilst still hot and allowing them to cool, such that, on cooling, the outer protective layer can be peeled from the inner core, at least at the ends of the pipe, to reveal an inner core surface suitable for electrofusion welding, wherein the dimensions of the pipe and the protective layer are such that the ratio of the external diameter of the pipe to the thickness of the protective layer is at least 70, preferably at least 100, and the cohesive strength of the outer protective layer, excluding any lines of weakness, at least at the ends of the pipe is greater than the peel strength of the adhesive bond between the outer protective layer and the inner core.

14. A process according to claim 13, in which the inner core comprises polyethylene and the outer protective layer comprises a propylene homo or co-polymer.

15. A process according to claim 13 or 14, in which the molten plastics materials are brought into contact with each other in the pressure area of an extruder die.

16. A process according to claim 4, in which the inner core and the outer protective layer are brought together at a temperature of from 150° C. to 220° C.

17. A method of joining two plastics pipes according to claim 1, which comprises peeling the outer protective layer from regions of the pipes to be joined, installing an electrofusion coupler over the bared regions of the pipes and activating the electrofusion coupler to fuse the regions of the pipes.

18. An electrofusion joint made in accordance with a method according to claim 17.

19. A plastics pipe which comprises an inner core and an outer protective layer, in which the outer protective layer has a thickness greater than 0.1 mm, the dimensions of the pipe and the outer protective layer are such that the ratio of the external diameter of the pipe to the thickness of the outer layer is at least 70, the cohesive strength of the outer protective layer, excluding any lines of weakness, at least at the ends of the pipe is greater than the strength of the adhesive bond between the outer protective layer and the inner core, and the adhesion between the outer protective layer and the inner core is in the range of from 0.2 to 0.5 N/mm width, measured by a semi-tensile peel test as hereinbefore described.

20. A method of making a joint in a plastics pipe according to claim 1, which comprises peeling the outer protective layer from the region of the pipe to be joined, installing an electrofusion coupler over the bared region of the pipe, and activating the electrofusion coupler to fuse the region of the pipe.

21. A plastics pipe according to claim 1 wherein the ratio of the external diameter of the pipe to the thickness of the protective layer is at least 100.

22. A plastics pipe according to claim 19 wherein the ratio of the external diameter of the pipe to the thickness of the protective layer is at least 100.

\* \* \* \* \*